Patented Jan. 2, 1923.

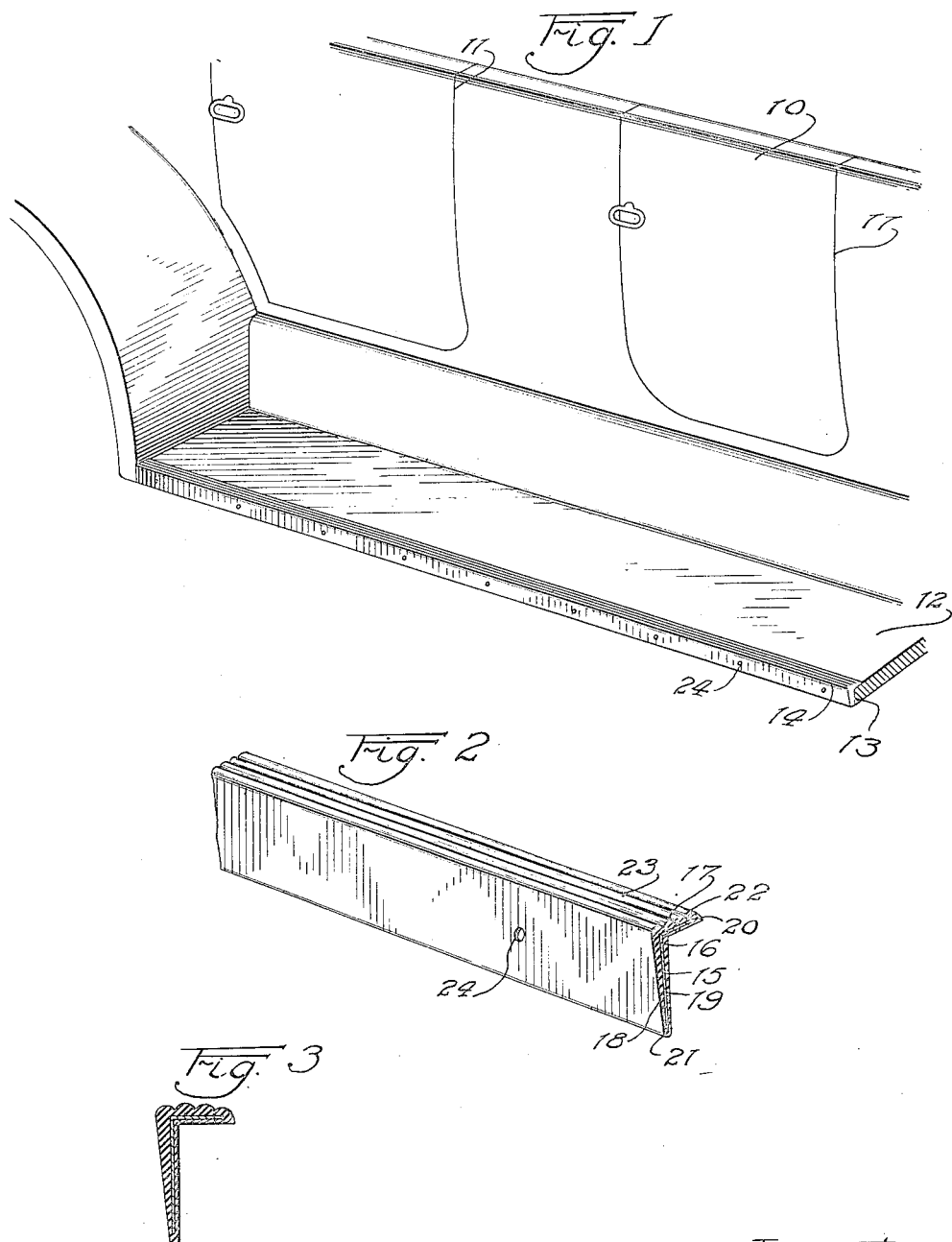

1,441,039

UNITED STATES PATENT OFFICE.

FRANK H. STANWOOD, OF CHICAGO, ILLINOIS.

NOSING FOR AUTOMOBILE RUNNING BOARDS AND THE LIKE.

Application filed January 11, 1919. Serial No. 270,641.

*To all whom it may concern:*

Be it known that I, FRANK H. STANWOOD, a citizen of the United States, residing in Chicago, in the county of Cook and State of Illinois, have invented a new and useful Improvement in Nosings for Automobile Running Boards and the like, of which the following is a specification.

This invention relates in general to nosing or binding strips and has more particular reference to devices of this character provided for use upon the outer edge of an automobile running board and in similar locations.

My invention has for a principal object the provision of a nosing strip so constructed and arranged that it will in a large measure reduce if not entirely eliminate the danger of persons slipping when stepping upon and from the running board of an automobile. When anyone gets into an automobile, the greatest danger of slipping is, it is believed, from stepping only part way upon the running board, and my present invention contemplates the provision of a nosing at the upper edge, so constructed and arranged that a secure foothold may be had even when the person entering or leaving the car fails to place his foot accurately upon the step.

A still further object of the invention is the provision of a nosing which will present no polished, lacquered or indeed other metal surfaces to be marred by a person stepping upon it in entering and leaving the car.

A further object of the invention is the provision of a protective covering or coating upon or about the metal nosing or binding strip heretofore employed upon the outer edge of the usual automobile running board. Prior to my invention, strips of this character have become worn or marred from weather or other conditions, with a consequent detrimental effect upon the pleasing and neat appearance of the car of which the running board forms a part, and my invention contemplates the elimination of this and other evils, and at the same time the attainment of useful and valuable results heretofore not found in the nosing or binding strips generally in use upon automobiles.

Numerous other objects and advantages of the invention will be apparent as it is better understood from the following description when considered in connection with the accompanying drawing illustrating a preferred embodiment thereof.

Referring to the drawing,

Figure 1 is a partial perspective view of the automobile body showing the running board provided with a nosing strip embodying my present invention.

Fig. 2 is an enlarged partial perspective detail view of the same, and

Fig. 3 is a section taken vertically and transversely of the nosing strip.

For the purpose of illustrating my invention I have shown on the drawing an automobile body 10 having the usual doors 11 and running board 12. The outer edge 13 of this board is provided with a nosing strip 14 made in accordance with my present invention. This strip consists of a metal sheet 15 bent at right angles at 16, and may if desired be of the form and dimensions of the usual binding or nosing strips employed. Upon this strip or reinforcement is provided a rubber body or covering 17 formed of two sheets 18 and 19 vulcanized respectively to the upper and lower faces of the metal strip 15. The rubber sheets or coverings 18 and 19 extend beyond the side edges of the metal sheet 16 and are joined together to form a completely enclosing body about the strip. The strip 19 is preferably of substantially the same thickness throughout and is relatively thin while the outer sheet 18 is of gradually increasing thickness from its lower edge 21 to the bend 16 at the top, and the part of it overlying the horizontal part or flange 22 of the metal strip 16 is thickened and formed in serrations or otherwise roughened or configured to provide edges or bodies of rubber to grip the sole of the shoe of a person getting into or leaving the automobile. In the present instance this roughening is provided by the forming of corrugations 23 extending lengthwise and above the part 22 of the strip 15. Suitable openings or screw receiving apertures 24 are provided through the downwardly extending part of the nosing to permit fasteners to be disposed therethrough and into the edge of the running board to hold the nosing in place.

When nosing or binding strips embodying my present invention are employed, it is largely immaterial whether the exposed part of the running board behind the nosing be anti-friction or smooth, since any slipping